June 5, 1956     J. G. KLECKER     2,748,910
LOCKING GATE FOR SHIFTING MECHANISM OF A SIX-SPEED TRANSMISSION
Filed Feb. 24, 1955
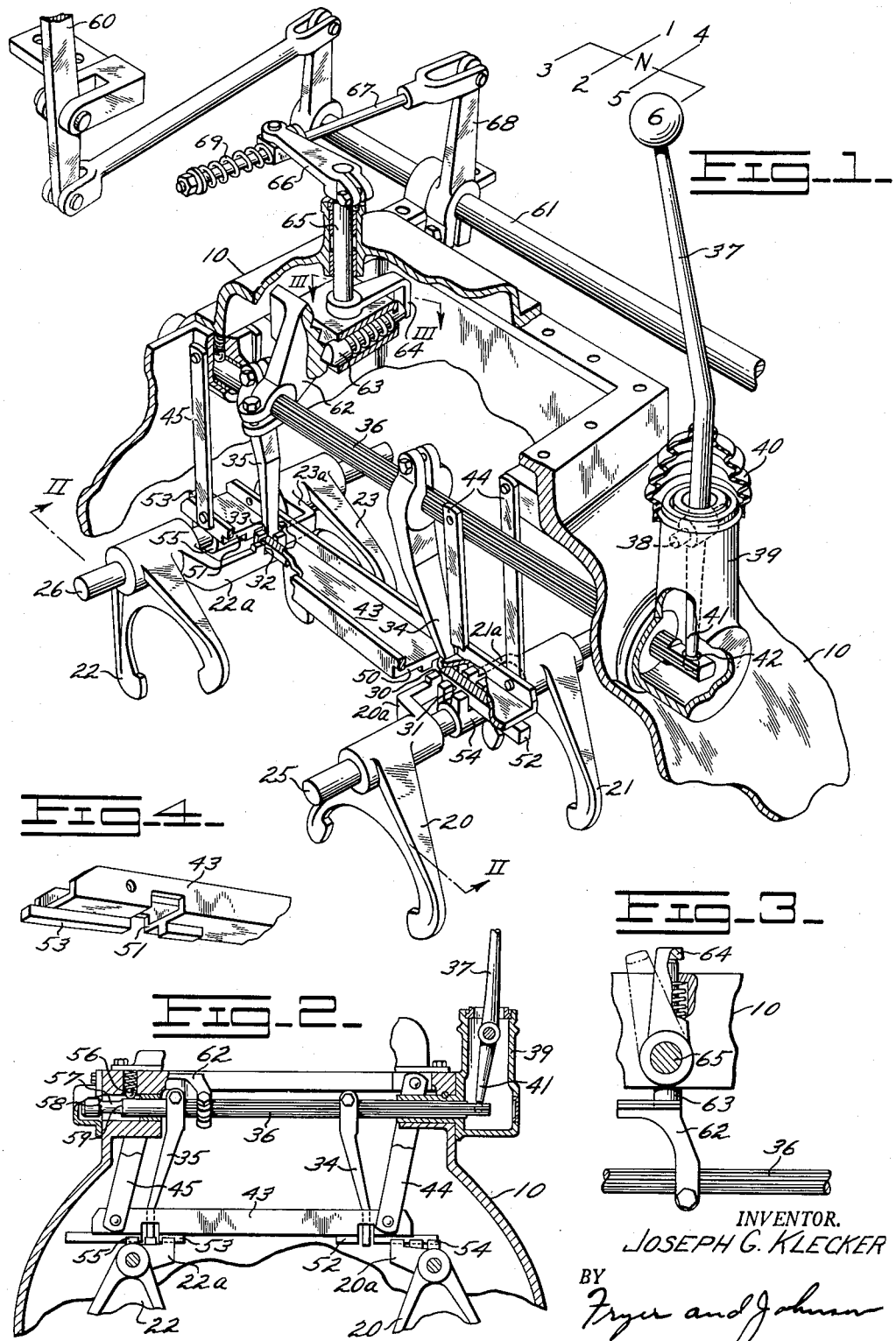
INVENTOR.
JOSEPH G. KLECKER
BY
Fryer and Johnson
ATTORNEYS

United States Patent Office 2,748,910
Patented June 5, 1956

2,748,910

LOCKING GATE FOR SHIFTING MECHANISM OF A SIX-SPEED TRANSMISSION

Joseph G. Klecker, Peoria, Ill., assignor to Caterpillar Tractor Co., Peoria, Ill., a corporation of California Application February 24, 1955, Serial No. 490,193

4 Claims. (Cl. 192—3.5)

This invention relates to shifting mechanisms for gear type transmissions of short axial dimensions in which gears to be shifted are disposed on spaced shafts so that the shifting forks are arranged in separated groups. The invention is particularly related to mechanism for locking out all but the parts selected for shifting during operation of such a transmission.

The shifting mechanism is particularly adapted for use with a speed-change transmission having two spaced counter-shafts carrying parts to be shifted such as is described in my assignee's co-pending application Serial No. 482,837 for "Gear-Type Power Transmission" filed January 19, 1955. This transmission is provided with constant-mesh gears which may be selectively included in any one of six different power paths by shifting the collars of conventional, positive-drive clutches normally associated with constant-mesh gearing. Since the speed-change gears are carried on a pair of countershafts parallel to, but widely spaced from each other, it is the object of this invention to provide simplified shift mechanism controllable by a single lever to effect changes of the various gear ratios. It is also an object of this invention to provide a locking gate which prevents more than one shiftable element from being shifted at one time, and also synchronizes the movements of the widely spaced shifting fingers.

In the drawings:

Fig. 1 is a schematic view, with parts broken away, showing a portion of the transmission housing, the gear shifting mechanism, a portion of a main clutch engaging mechanism, and an interlock between these two mechanisms;

Fig. 2 is a cross-sectional view taken on line II—II of Fig. 1 through the transmission housing;

Fig. 3 is a cross-sectional view of the interlock taken on line III—III of Fig. 1; and Fig. 4 is a fragmentary isometric view of a portion of a locking gate.

In Fig. 1, a portion of a transmission housing is shown at 10, the housing being adapted to support a plurality of shafts (not shown) which are parallel to and spaced from each other and carry appropriate input gears, speed-change gears, and output gears (also not shown) to provide several gear ratios. Although the shifting mechanism illustrated is designed for use with a constant-mesh type of transmission provided with positive-drive clutches which have shiftable collars to selectively include the speed-change gears in various power trains, the mechanism may also be used with sliding gear transmissions having gears adapted to be moved into and out of mesh with each other to establish various power trains.

The transmission disclosed in the previously mentioned co-pending application is provided with constant-mesh gearing carried on a plurality of shafts. Two of the said shafts carry the speed-change gears and are disposed in the transmission parallel to each other and spaced an appropriate distance from each other to accommodate the size of the gears selected to be used. The shift collars of the positive-drive clutches associated with the speed-change gears may be moved by means of shift forks indicated at 20, 21, 22, and 23 which are adapted to be received in an annular groove formed in the collars of conventional clutches of this type.

The forks indicated at 20 and 21 are slidably mounted on a supporting rail 25 suitably disposed within the transmission housing 10; and the forks 22 and 23 are similarly carried on another rail 26. When the shifting mechanism is used in conjunction with the transmission described in the aforementioned application, movement of the fork 20 to the left (as viewed in Fig. 1) will engage the shift collar of the clutch associated with a first-speed gear; while movement to the right will first disengage the said shift collar from the first-speed gear and then engage the collar with a second-speed gear. In a similar manner, movement of the fork 21 to the right will result in a third-speed gear being included in the power train; movement of the fork 22 to the left will effect a fourth-speed gear ratio; movement of the fork 22 to the right will result in a fifth-speed gear ratio; and movement of the fork 23 to the right will result in a sixth-speed gear ratio. The fork 23 is illustrated in Fig. 1 as being in a position to effect a sixth-speed gear ratio in this particular transmission. It is desirable that each shift fork be locked against shifting movement during shifting of any other fork.

Each of the shift forks is provided with a projecting arm, indicated at 20a, 21a, 22a, and 23a respectively which have notches 30, 31, 32, and 33 adapted to receive one of a pair of shifting fingers 34 and 35. When the transmission is in a neutral position, all of the notches of the forks are aligned, and the finger 34 may be indexed with either of the notches 30 or 31 in the forks 20 and 21 respectively while the finger 35 may be indexed with either of the notches 32 or 33 in the forks 22 and 23 respectively.

The shifting fingers 34 and 35 are securely mounted on a cross-shaft 36 adapted for reciprocating as well as rocking motion in the transmission housing and splined to facilitate the formation of non-rotatable connections. Reciprocating movement of the cross-shaft 36 is effected by a control lever 37 pivotally mounted by a pin 38 in a support column 39 to permit lateral movement of the contol lever in relation to the support column; while the column 39 is mounted in the transmission housing 10 to allow rocking motion of the column on an axis at right angles to the axis of the pivot pin 38. A resilient boot 40 is secured to the control lever 37 at one end and the support column at the other to prevent entrance of dirt or other foreign matter. The control lever is provided with a cane end 41 adapted to be received in a socket 42 provided in the cross-shaft 36. Movement of the control lever 37 about the axis of the pivot shaft 38 will result in lateral motion being imparted to the cross-shaft 36, while movement of the control lever and the support column 39 about the axis of the column will result in rocking motion of the cross-shaft 36.

To prevent more than one of the forks from being shifted at a given time and to synchronize the lateral movements of the widely spaced shifting fingers 34 and 35, a swinging locking-gate 43 is provided. Two pairs of parallel links, indicated at 44 and 45, are pivotally attached to the transmission 10 and support the gate 43 above the shifting forks 20, 21, 22, and 23. The gate is provided with two slots 50 and 51 through which the shifting fingers 34 and 35 extend to index with the aligned notches of the shifting forks. These slots are parallel to the rails 25 and 26 to allow movement of the shift fingers resulting from rocking of the cross-shaft 36. At each end of the gate 43, an interrupted locking bar, portions of which are indicated at 52 and 53, is secured to the underside of the gate as best shown in Fig. 4. Each of these bars indexes with the notches in the respective forks at the opposite ends of the gate, as well as notches provided in guide members 54 and 55 secured to the rails 25 and 26, respectively. As shown in Figs. 2 and 4, the locking bars 52 and 53 are interrupted by each of the slots 50 and 51 in the gate 43 through which the shift fingers 34 and 35 extend. These slots are positioned in the gate at an appropriate distance in relation to the spacing of the arms of the shift forks so that movement of the cross-shaft 36 to the right will allow the finger 34 to index with either the forks 20 or 21 while the locking bars 52 and 53 prevent movement of any of the other forks, and movement of the cross-shaft 36 to the left will allow the finger 35 to index with either the forks 22 or 23 while at the same time the locking bars will prevent movement of the other forks.

A spring-loaded ball 56 is disposed in the transmission housing in a position to index with a reduced section 57 of the cross-shaft 36. The ball contacts shoulders 58 or 59 to indicate alignment of fingers 34 or 35 with either of shifting forks 20 or 22. Further movement of the shaft in either direction compresses the spring as shown in Fig. 2 to enable shifting of the forks 21 and 23.

To prevent shifting of the transmission while the master clutch of a vehicle is engaged, an interlock system is also provided. As shown in Fig. 1, a portion of a clutch control lever is indicated at 60 and is associated with linkage, a part of which is shown at 61, connecting it to the engaging mechanism of the clutch (not shown). Movement of the upper part of the lever 60 to the left, as viewed in Fig. 1, will effect engagement of the clutch, while movement to the right will effect disengagement.

The interlock system comprises an arm 62 fixed to the shaft 36 and having a face with three notches for reception of a detent 63 mounted in the transmission housing. The detent 63 thus locks the shaft 36 against rotation when the main clutch is engaged, and the end of a lever 64 prevents retraction of the detent. This lever 64 is fixed to a shaft 65 rotatable through connections 66, 67 and 68 which moves the lever 64 to the position indicated by the broken lines in Fig. 3 when the clutch linkage is moved to its disengaging position. A spring 68 in these connections absorbs the difference in the magnitude of movement of the parts.

With this control mechanism, speed-change gears carried on widely spaced parallel shafts may be shifted by means of shifting fingers actuated by a single control lever; and the lateral movements of the shifting fingers may be synchronized by means of an elongated gate, which is also provided with a locking bar to prevent shifting of more than one speed-change gear at a time.

I claim:

1. In a transmission having two spaced groups of shifting forks, a notched part on each fork, all of the notches being arranged for alignment, a shifting finger for each group of forks, a common shaft supporting both shifting fingers, and control means to move the shaft axially to cause registry of either shifting finger with the notch of any fork in its group and to rock the shaft to effect shifting by the selected fork, a common locking mechanism extending between both groups of forks and connected with both fingers to prevent shifting of any but the single fork selected.

2. In a transmission having two spaced groups of shifting forks, a notched part on each fork, all of the notches being arranged for alignment, a shifting finger for each group of forks, a common shaft supporting both shifting fingers, and control means to move the shaft axially to cause registry of either shifting finger with the notch of any fork in its group and to rock the shaft to effect shifting by the selected fork, a common locking mechanism extending between both groups of forks and connected with both fingers to prevent shifting of any but the single fork selected, said locking mechanism comprising a member movable in alignment with the notches in the forks and having slots through which the shifting fingers extend.

3. In a transmission having two spaced groups of shifting forks, a notched part on each fork, all of the notches being arranged for alignment, fixed guide members provided with notches being arranged for alignment with the notches of the shift forks, a shifting finger for each group of forks, a common shaft supporting both shifting fingers, and control means to move the shaft axially to cause registry of either shifting finger with the notch of any fork in its group and to rock the shaft to effect shifting by the selected fork, a common locking mechanism extending between both groups of forks and connected with both fingers to prevent shifting of any but the single fork selected, said locking mechanism comprising a member movable in alignment with the notches in the forks and having slots through which the shifting fingers extend and bar means in registry with the notches in the fixed guide members and the notches of all of the forks except the single fork selected to be shifted.

4. In a vehicle having a transmission provided with a pair of spaced shifting fingers, a common shaft supporting both shifting fingers, and control means to move the shaft axially and to rock the shaft to effect movement of the shifting fingers, said vehicle also having a main clutch and engaging mechanism associated therewith, an interlock mechanism between the clutch engaging mechanism and the shifting finger support shaft to prevent rocking of said shaft while the clutch is engaged, said interlock mechanism comprising a detent disposed in the transmission, an arm fixed to the shaft and provided with a plurality of notches adapted to receive the detent, a lever adapted to prevent release of the detent while the clutch is engaged, and means operable upon release of the clutch to retract said lever.

References Cited in the file of this patent

UNITED STATES PATENTS

| 1,120,157 | Parker | Dec. 8, 1914 |
| 1,802,909 | Craig | Apr. 28, 1931 |
| 2,280,641 | Snow | Apr. 21, 1942 |
| 2,320,454 | Eberhard | June 1, 1943 |
| 2,517,871 | Gustafson | Aug. 8, 1950 |
| 2,667,082 | Brock et al. | Jan. 26, 1954 |